United States Patent
Hartmann et al.

(10) Patent No.: US 9,841,087 B2
(45) Date of Patent: Dec. 12, 2017

(54) BELT TENSIONER

(71) Applicant: Schaeffler Technologies AG & Co. KG, Herzogenaurach (DE)

(72) Inventors: Bernd Hartmann, Weisendorf (DE); Zoran Maricic, Furth (DE); Alexander Weidner, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/120,613

(22) PCT Filed: Feb. 4, 2015

(86) PCT No.: PCT/DE2015/200062
§ 371 (c)(1),
(2) Date: Aug. 22, 2016

(87) PCT Pub. No.: WO2015/131888
PCT Pub. Date: Sep. 11, 2015

(65) Prior Publication Data
US 2017/0009850 A1    Jan. 12, 2017

(30) Foreign Application Priority Data
Mar. 5, 2014    (DE) .......................... 10 2014 203 952

(51) Int. Cl.
*F16H 7/12*     (2006.01)
*F02B 67/06*    (2006.01)
(Continued)

(52) U.S. Cl.
CPC ........... *F16H 7/1281* (2013.01); *F02B 63/04* (2013.01); *F02B 67/06* (2013.01);
(Continued)

(58) Field of Classification Search
CPC .......... F16H 7/1281; F16H 2007/0874; F16H 2007/0806; F16H 2007/081; F16H 2007/0893
(Continued)

(56) References Cited

U.S. PATENT DOCUMENTS 1,557,486 A * 10/1925 Valentine .............. F16H 7/1281
  474/135
4,351,636 A *  9/1982 Hager ..................... F02B 67/06
  474/135
(Continued)

FOREIGN PATENT DOCUMENTS

DE         508156    9/1930
DE    102009014198    9/2010
(Continued)

*Primary Examiner* — Henry Liu
(74) *Attorney, Agent, or Firm* — Volpe and Koenig, P.C.

(57) ABSTRACT

A belt tensioner for a generator belt drive of an internal combustion engine, is provided having: —an annular housing part which is secured on the generator housing so as to enclose the generator shaft, —an annular tensioning part which is mounted on the housing part in a pivotal manner about the generator shaft, —a single tension roller which is mounted on the tensioning part and pretensions the belt, —and a spring which is clamped between the housing part and the tensioning part and which applies a torque to the tensioning part in order to generate the belt tension. The spring should be a bow spring which extends parallel to the belt plane (e) and circumferentially and completely outside of a pivoting range of the tension roller.

10 Claims, 3 Drawing Sheets

(51) Int. Cl.
*F02B 63/04* (2006.01)
*F16H 7/08* (2006.01)

(52) U.S. Cl.
CPC ............... *F16H 2007/0806* (2013.01); *F16H 2007/0865* (2013.01); *F16H 2007/0893* (2013.01)

(58) Field of Classification Search
USPC .................................................. 474/135, 134
See application file for complete search history.

(56) References Cited

U.S. PATENT DOCUMENTS

| | | | | |
|---|---|---|---|---|
| 4,571,223 A * | 2/1986 | Molloy | ................ | F16H 7/1281 474/112 |
| 4,758,208 A * | 7/1988 | Bartos | ................ | F16H 7/1281 474/111 |
| 6,648,783 B1 * | 11/2003 | Bogner | ................ | F16H 7/1281 474/134 |
| 7,494,434 B2 * | 2/2009 | Mc Vicar | ............. | F16H 7/1281 474/101 |
| 7,824,286 B2 * | 11/2010 | Schmid | ................ | F16H 7/1263 411/546 |
| 7,892,125 B2 * | 2/2011 | Nelson | ................ | F16H 7/1254 474/101 |
| 8,002,657 B2 * | 8/2011 | Antchak | .............. | F16H 7/1218 474/101 |
| 8,287,410 B2 * | 10/2012 | Schmid | ................ | F16H 7/1263 411/546 |
| 8,602,930 B2 * | 12/2013 | Deneszczuk | ......... | F16H 7/1281 474/112 |
| 8,684,872 B2 * | 4/2014 | Mevissen | ............. | F16H 7/1218 474/135 |
| 8,821,328 B2 * | 9/2014 | Jud | ...................... | F16H 7/1281 474/134 |
| 8,968,128 B2 * | 3/2015 | Wolf | .................... | F16H 7/1281 474/135 |
| 9,097,314 B2 * | 8/2015 | Wolf | .................... | F16H 7/1281 |
| 9,103,411 B2 * | 8/2015 | Wolf | .................... | F16H 7/1281 |
| 9,182,015 B2 * | 11/2015 | Mack | ................... | F16H 7/1281 |
| 9,416,853 B2 * | 8/2016 | Wolf | .................... | F02B 67/06 |
| 9,625,013 B2 * | 4/2017 | Wolf | .................... | F16H 7/1281 |
| 2004/0227400 A1 * | 11/2004 | Kraus | ................... | F16H 7/1209 305/143 |
| 2006/0100051 A1 * | 5/2006 | Di Giacomo | ............ | F16G 1/28 474/170 |
| 2006/0217222 A1 * | 9/2006 | Lolli | .................... | F16H 7/1281 474/134 |
| 2007/0037648 A1 * | 2/2007 | Di Giacomo | ......... | F16H 7/1281 474/134 |
| 2008/0220919 A1 * | 9/2008 | Antchak | ............... | F16H 7/1218 474/135 |
| 2009/0215564 A1 * | 8/2009 | Pflug | .................... | F16H 7/1281 474/135 |
| 2009/0275432 A1 * | 11/2009 | Dell | ...................... | F16H 7/1281 474/135 |
| 2009/0298631 A1 * | 12/2009 | Jud | ...................... | F16H 7/1281 474/237 |
| 2010/0022340 A1 * | 1/2010 | Schmidl | ................ | F16H 7/1281 474/135 |
| 2010/0331127 A1 * | 12/2010 | Dec | ...................... | F16H 7/1218 474/135 |
| 2011/0034281 A1 * | 2/2011 | Schmid | ................ | F16H 7/1263 474/135 |
| 2011/0070985 A1 * | 3/2011 | Deneszczuk | .......... | F16H 7/1281 474/135 |
| 2011/0070986 A1 * | 3/2011 | Maguire | ................ | F02B 67/06 474/135 |
| 2012/0004059 A1 * | 1/2012 | Ma | ........................ | F16H 7/1218 474/135 |
| 2013/0040770 A1 * | 2/2013 | Wolf | .................... | F16H 7/1281 474/134 |
| 2013/0079185 A1 * | 3/2013 | Schauerte | ............. | F16H 7/1281 474/135 |
| 2013/0095967 A1 * | 4/2013 | Wolf | .................... | F16H 7/1281 474/135 |
| 2013/0203535 A1 * | 8/2013 | Mack | ................... | F16H 7/1281 474/134 |
| 2014/0256488 A1 * | 9/2014 | Wolf | .................... | F16H 7/1281 474/135 |
| 2014/0342862 A1 * | 11/2014 | Wolf | .................... | F02B 67/06 474/117 |
| 2015/0308545 A1 * | 10/2015 | Harvey | ................ | F16H 7/1218 474/117 |

FOREIGN PATENT DOCUMENTS

| | | |
|---|---|---|
| DE | 102011082764 | 4/2012 |
| DE | 102011082330 | 2/2013 |
| DE | 102011089394 | 6/2013 |
| DE | 102012209028 | 12/2013 |
| EP | 2573423 | 3/2013 |

* cited by examiner

BELT TENSIONER

BACKGROUND

The invention relates to a belt tensioner for a generator belt drive of an internal combustion engine. The belt tensioner comprises:

An annular housing part that is mounted on the generator housing so as to enclose the generator shaft, An annular tensioning part that is supported on the housing part so that it can pivot about the generator shaft, A single tension pulley that is supported on the tensioning part and pretensions the belt, And a spring that is clamped between the housing part and the tensioning part and applies a torque to the tensioning part for generating the belt pretension.

Such a belt tensioner is known from EP 2 573 423 A1. The spring is constructed there as a helical spring surrounding the generator shaft.

SUMMARY

The present invention is based on the objective of improving the design of a belt tensioner of the type specified above with respect to its most compact possible construction.

The solution to achieving the object is given in that the spring is a bow spring that extends parallel to the plane of the belt and circumferentially completely outside of the pivoting range of the tension pulley. This structural design of the tensioner spring mounting—a bow spring is, as is known, always a helical compression spring whose longitudinal extent is not straight, but has a circular arc shape—enables the spring installation space to be limited to a circular arc that is not covered by the operating, pivoting tension pulley. Because the spring installation space does not extend in the pivoting range of the tension pulley relative to the known belt tensioner, the tensioning part and the tension pulley can be arranged with a comparatively small axial state to the generator housing. This then applies also to the belt pulley that runs in the same belt plane as the tension pulley, so that, as a result, an axially especially compact assembly made from the generator and belt tensioner is provided. Because the belt plane also runs at a comparatively small distance to the generator housing, the free length of the generator shaft between the belt pulley and the first bearing point in the generator housing is also accordingly short in support of comparatively small shaft bending.

BRIEF DESCRIPTION OF THE DRAWINGS

Additional features of the invention are given from the following description and from the drawings in which an embodiment of a belt tensioner according to the invention is shown. Shown are.

DETAILED DESCRIPTION OF THE PREFERRED EMBODIMENTS

Figure 1:
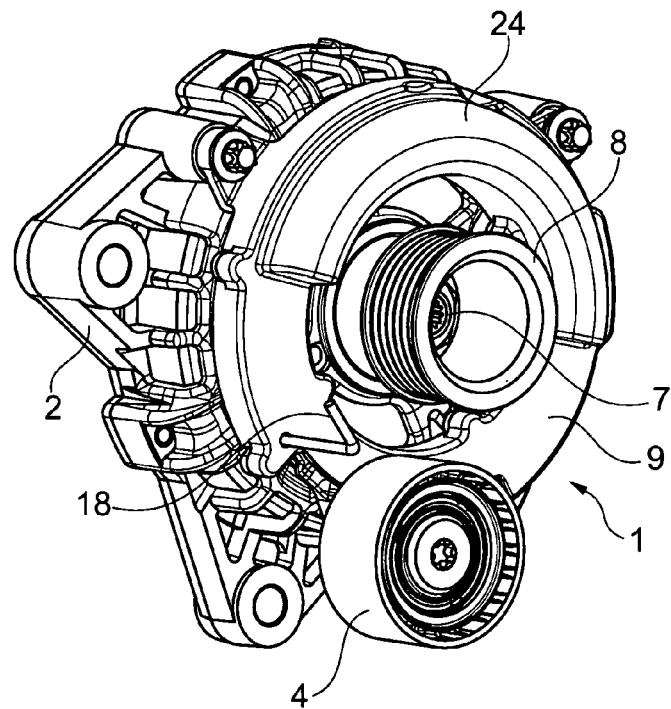
FIG. 1 the generator of a generator belt drive with the belt tensioner mounted on this drive in a perspective view, FIG. 2 the belt tensioner in rear view, FIG. 3 the belt tensioner in longitudinal section, FIG. 4 the belt tensioner without housing cover in rear view, FIG. 5 the detail X from FIG. 4, FIG. 6 the housing part of the belt tensioner as an individual part in perspective front view, FIG. 7 the tensioning part of the belt tensioner as an individual part with plastic lining in perspective rear view, FIG. 8 the tensioning part of the belt tensioner as an individual part without plastic lining in perspective front view, FIG. 9 the spring cup of the belt tensioner in perspective individual part view, FIG. 10 the bow spring of the belt tensioner in perspective individual part view.
Figure 2:
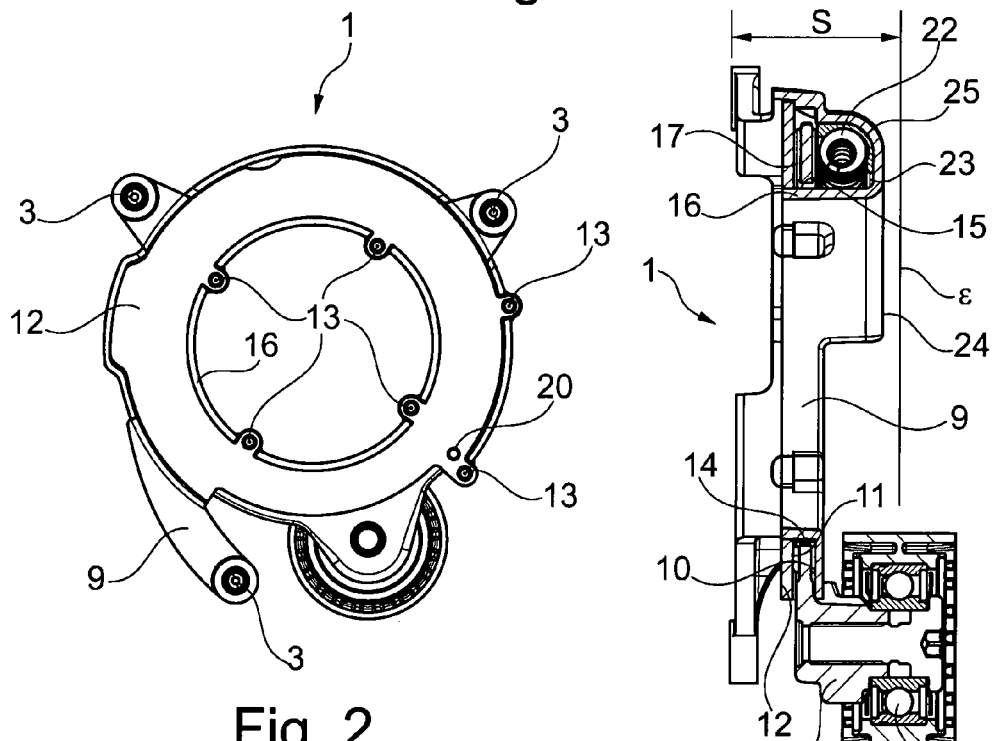
Figure 3:
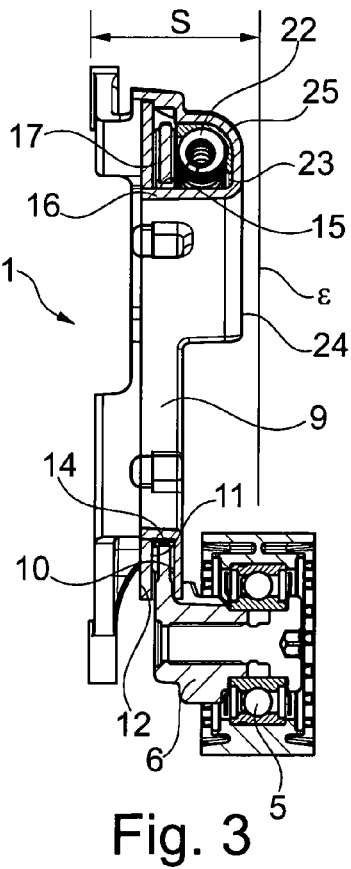

FIGS. 1 to 3 show a belt tensioner 1 according to the invention in assembly with a generator of a generator belt drive of an internal combustion engine or as a completely assembled individual part. The belt tensioner is mounted on the belt-side end of the generator housing 2 and is here screwed at three fastening points 3 with the generator housing. Because the generator is a conventional generator without a motor mode, i.e., without a starting function of the internal combustion engine, the belt tensioner has only a single tension pulley 4 for pretensioning the belt in its slack section. The ball bearing 5 of the tension pulley is screwed to an annular tensioning part 6 that surrounds the shaft 7 with the belt pulley 8 of the generator and is supported so that it can pivot about the generator shaft and—more precisely—in an annular housing part 9. The pivoting support of the tensioning part is presently realized concentric to the generator shaft, but in an alternative according to the invention, could also be arranged with an axial offset about the generator shaft (as long as the belt pulley has free room of motion in the radial direction). The inner diameter of the housing part also surrounding the generator shaft is significantly larger than the diameter of the belt pulley, so that the required cooling air feed into the generator is not negatively affected.

The axial pivot bearing of the tensioning part 6 in the housing part 9 is formed on one side by an end face 10 of the housing part facing the generator and on the other side by an end face 11 of a housing cover 12 that faces away from the generator and is screwed to the housing part on the back side of the belt tensioner 1 at six fastening points 13. Obviously other known and/or non-detachable fastening types, such as swaging, riveting, are also possible. The radial pivot bearing of the tensioning part in the housing part is formed by the inner annular circumference 14 of the tensioning part and by the outer circumference 15 of a housing-fixed annular collar 16 that extends between the bearing end face 10 of the housing part and the housing cover (see also FIG. 4). With regard to the required bearing properties and the damping of the operating tensioning part movements, the material pairing of the sliding bearing is made from the metallic housing surfaces 10, 11 and a plastic lining 17 of the tensioning part made from polyamide with PTFE inserted therein, which covers the two end sides and the inner annular circumference of the tensioning part (see also FIG. 7). The plastic lining clipped on the tensioning part has a two-part design, wherein the first lining part covers the end side of the tensioning part at the bottom in FIG. 7 and its inner annular circumference with an annular collar and wherein the second lining part covers the end side of the tensioning part at the top in FIG. 7.

The belt tensioner 1 is fixed in the circumferentially pretensioned assembly position of the tension pulley 4 by a removable securing pin 18 that blocks the tensioning part 6 and the housing part 9 in this position relative to each other. Here, the securing pin passes through two aligned holes 19 and 20 in the housing part (see FIG. 6) or in the housing cover 12 (see FIG. 2) and a circumferential recess 21 in the tensioning part (see FIG. 8).

If necessary, the ingress of foreign particles and spray water into the housing interior can be made more difficult by a (not shown) separate seal between the housing part 9, the tensioning part 6, and the housing cover 12.

The pretensioning introduced by the tension pulley 4 into the belt is generated by a bow spring 22 that is supported parallel to the plane of the belt $\epsilon$ (epsilon) in a correspondingly arc-shaped space 23 of the housing part 9 at the side of the tensioning part 6 and torque is applied to the tension pulley—in FIG. 1 in the counterclockwise direction. A clamping direction in the opposite direction is obviously possible with correspondingly adapted tensioner components. The spring holding space 23 is formed by a bulge 24 of the housing part extending in the axial direction toward the tension pulley (i.e., in the axial direction of the shaft and pulley). The axial extent of the bulge is so large that it overlaps with the tension pulley in the axial direction. This can be seen clearly from FIG. 3. The axial end face of the bulge is there to the right of the left end face of the tension pulley. The circumferential angle of the bulge is approx. 180° and has a center that runs in the nominal operating position of the belt tensioner 1 essentially diametrically opposite the tension pulley. Its pivoting range is limited by mechanical stops of the tensioning part on the housing part to an angle of approx. 40°, so that the bulge—despite its axial extent overlapping with the tension pulley—has a clear distance to the circumference of the tension pulley also in both end positions of the pivoting range. Because the spring holding space and the bulge limiting this space do not extend circumferentially into the pivoting range of the tension pulley, but instead run completely outside of this range with a circumferential distance, the tension pulley and consequently the entire belt plane are arranged with a comparatively small axial distance to the generator housing 2. This is shown in FIG. 3 with reference to the distance measure S between the screw-in plane of the housing part and the belt plane.

Figure 4:
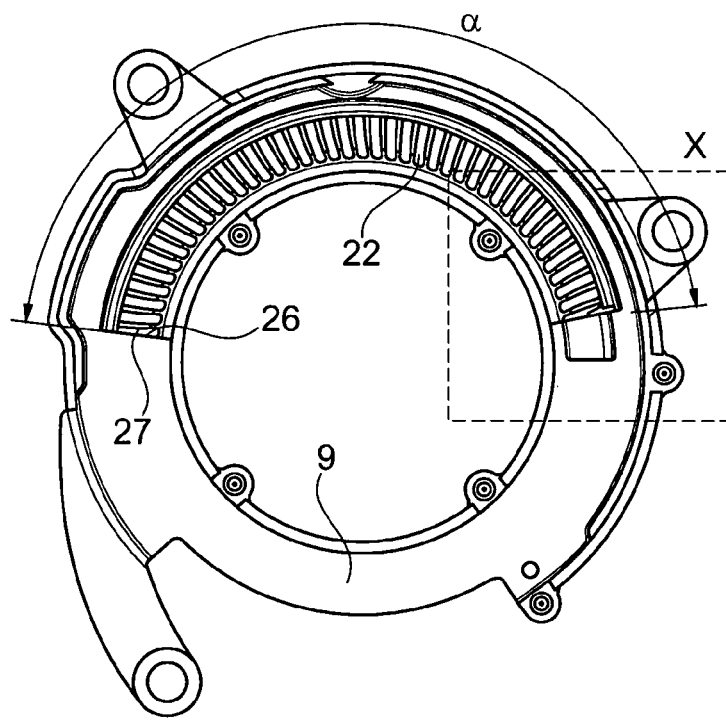
Figure 5:
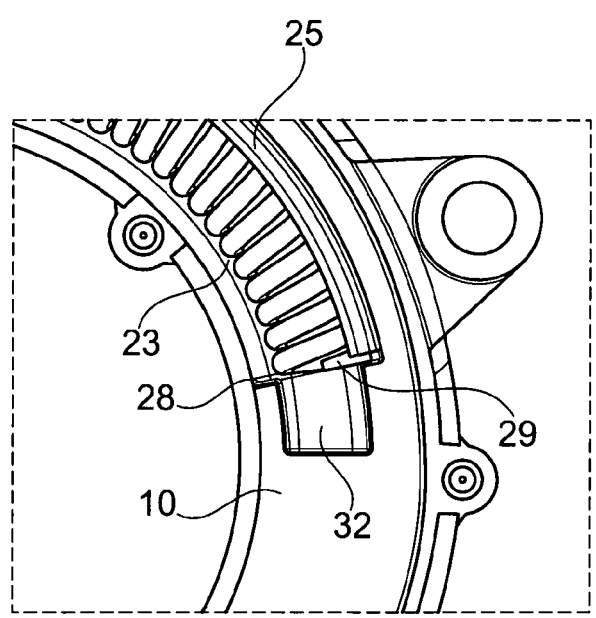
Figure 10:
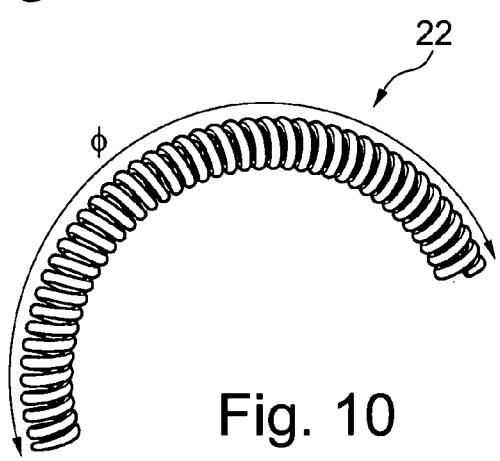

FIGS. 4 and 5 show the assembly state of the belt tensioner 1 in which the bow spring 22 and a spring cup 25 covering the spring holding space 23, but not the tensioning part 6 and the housing cover 12, are mounted in the housing part 9. The spring holding space concentric to the pivoting support of the tensioning part is set back axially relative to the bearing end face 10 of the housing part and limited by two circumferential end walls, wherein the one end wall 26 is used as a spring support for the housing part-side end 27 of the bow spring and the other end wall 28 is used before the assembly of the tensioning part as a circumferential stop for the tensioning part-side spring end 29. In the embodiment, the bow spring is placed before the assembly of the tensioning part under slight pretensioning between the end walls in the spring holding space. This assembly pretensioning is produced in that the arc angle $\alpha$ (alpha) of the spring holding space is smaller than the arc angle $\Phi$ (phi) of the non-tensioned bow spring (see FIG. 10) and has the effect that it makes it harder for the bow spring and the spring cup to fall out from the spring holding space before assembly of the tensioning part.

The arc angle $\Phi$ of the non-tensioned bow spring 22 is presently approximately 180°. In particular, but nevertheless not only for the case that a larger arc angle is desired but is unfavorable for the winding of the bow spring, two or more bow springs can also be provided in series and a spring holding space 23 can be provided with arc angle $\alpha$ adapted accordingly. Independently, bow springs connected in parallel in the form of a spring package with one outer and one inner bow spring are also possible. With the help of these parameters, the total characteristics of the tensioner spring mounting can be varied within wide limits to the desired torque profile of the tension pulley 4.

Figure 6:
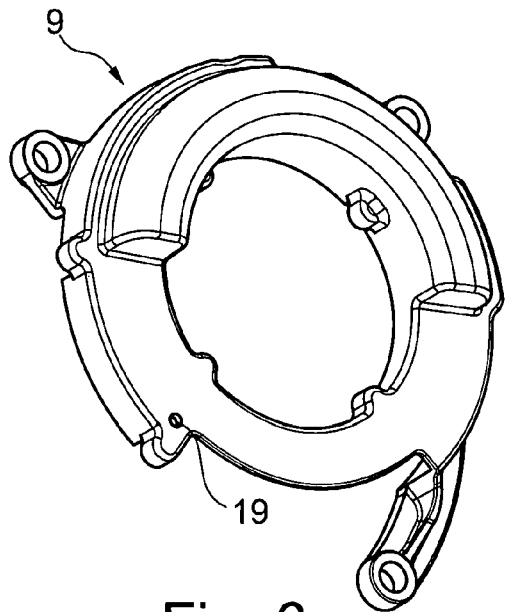
Figure 7:
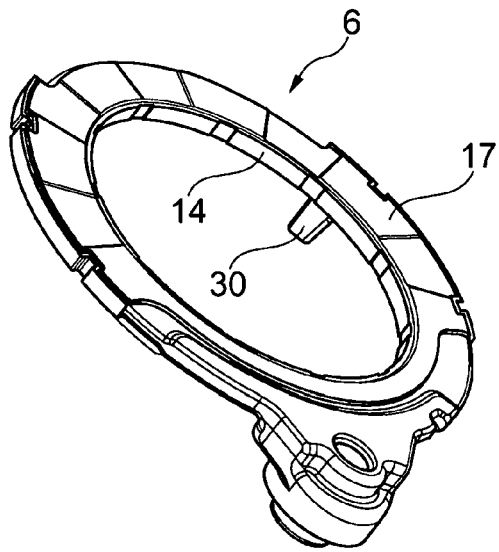
Figure 8:
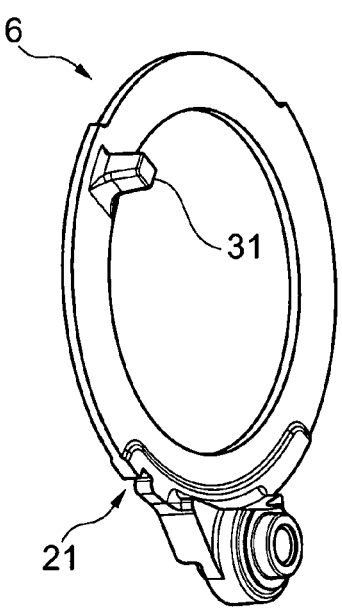

The housing part 9 shown in FIG. 6 and the tensioning part 6 shown in FIGS. 7 and 8 with or without the sliding bearing lining 17 are each made from aluminum castings. Alternatively, sheet-metal formed parts made from one or more parts are possible. The tensioning part is provided with a catch 30 that projects into the spring holding space 23 and is used as a spring support 31 running lateral to the tensioning part for the tensioning part-side spring end 28. The catch is constructed as a projection that is raised from the ring body of the tensioning part axially to the side of the tension pulley 4, so that the spring support for the tensioning part-side spring end runs completely next to the annular body and on the same side as the tension pulley. One advantage of this arrangement is that the force pair introduced by the bow spring and the tension pulley into the pivoting support of the tensioning part generates a comparatively small tilting moment.

The other end wall 28 is provided with a recess 32 that holds the catch 30 during the assembly of the tensioning part 6 in the housing part 9. The tensioning part assembly is considerably simplified in this way, because during insertion of the catch into the recess, a space-creating displacement of the bow spring 22 contacting the other end wall is not necessary. In the fixed assembled position according to FIG. 1 and in the nominal operating positions of the tension pulley 4, the bow spring is clamped between the one end wall 26 on the housing part-side spring end 27 and the catch on the tensioning part-side spring end 29.

Figure 9:
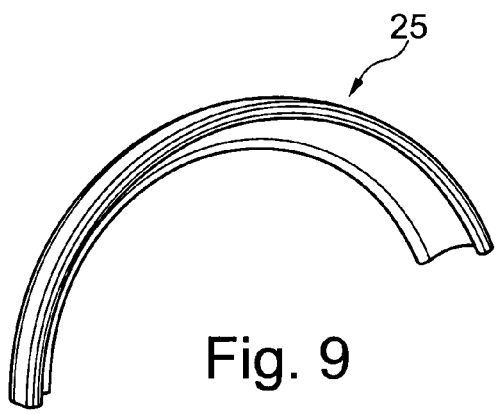

The bow spring 22 is supported in the radially outward direction on the spring cup 25 that acts against spring oscillations. The spring cup shown in FIGS. 3 and 9 has an essentially L-shaped cross section that is adapted to approximately half the spring circumference. The spring cup is made from plastic, in particular, with glass-fiber reinforcement, as a PTFE compound, and/or from carbon fiber-reinforced PA46 (polyamide), PPS (polyphenylene sulfide), or PEEK (polyether ether ketone). Depending on the tribological loading of the spring cup by the oscillating bow spring during operation, other wear-resistant materials, coatings, or grease could be used as alternatives in the spring-cup contact.

LIST OF REFERENCE NUMBERS

1 Belt tensioner
2 Generator housing
3 Fastening point
4 Tension pulley
5 Ball bearing
6 Tensioning part
7 Shaft of the generator
8 Belt pulley
9 Housing part
10 End face of the housing part
11 End face of the housing cover
12 Housing cover
13 Fastening point
14 Inner ring circumference of the tensioning part
15 Outer circumference of the ring collar
16 Ring collar
17 Plastic lining 18 Securing pin
19 Hole for the securing pin
20 Hole for the securing pin
21 Recess for the securing pin
22 Bow spring
23 Spring holding space
24 Bulge of the spring holding space
25 Spring cup
26 One end wall
27 Housing part-side spring end
28 Other end wall
29 Tensioning part-side spring end
30 Catch
31 Spring support for the tensioning part-side spring end
32 Recess for catch

The invention claimed is:

1. A belt tensioner for a generator belt drive of an internal combustion engine, comprising:
    an annular housing part adapted to be mounted on a generator housing so as to surround a generator shaft,
    an annular tensioning part supported on the housing part for pivoting movement about the generator shaft, the annular tensioning part formed as a ring body and includes an axially extending projection forming a catch,
    a single tension pulley supported on the tensioning part and adapted to pretension the belt,
    a spring clamped between the housing part and the catch of the tensioning part that applies a torque to the tensioning part for generating a belt pretensioning, wherein the spring is a bow spring that extends parallel to a belt plane ($\epsilon$) and circumferentially completely outside of a pivoting range of the tension pulley.

2. The belt tensioner according to claim 1, wherein the housing part has an arc-shaped space that is limited by two circumferential end walls for holding the bow spring and the bow spring is clamped between a first one of the end walls on a housing part-side spring end and the catch of the tensioning part projecting into the spring holding space on a tensioning part-side spring end.

3. The belt tensioner according to claim 2, wherein the spring holding space is formed by a bulge of the housing part that overlaps the tension pulley in an axial direction, wherein the bulge is spaced apart from the tension pulley circumferentially in both end positions of a pivoting range of the tension pulley.

4. The belt tensioner according to claim 2, wherein the catch extends axially to sides of the tension pulley.

5. The belt tensioner according to claim 4, wherein a second one of the end walls is used before assembly of the tensioning part on the housing part as a circumferential stop for the tensioning part-side spring end and is provided with a recess holding the catch for the assembly of the tensioning part on the housing part.

6. The belt tensioner according to claim 2, wherein an arc angle ($\alpha$) of the spring holding space limited by the end walls is smaller than an arc angle ($\Phi$) of the non-tensioned bow spring.

7. The belt tensioner according to claim 2, wherein the spring holding space is covered with a spring cup against which the bow spring is supported in a radially outward direction.

8. The belt tensioner according to claim 7, wherein the spring cup is made from plastic.

9. The belt tensioner according to claim 1, wherein an axial pivot bearing of the tensioning part is formed on the housing part by the housing part on one side and by a housing cover mounted on the housing part on an other side.

10. The belt tensioner according to claim 9, wherein the axial pivot bearing of the tensioning part is an axial and radial pivot bearing and is formed on the housing part by a plastic lining of the tensioning part.

\* \* \* \* \*